United States Patent [19]

Sugden

[11] Patent Number: 5,650,779
[45] Date of Patent: Jul. 22, 1997

[54] POSITION ENCODER

[75] Inventor: David Mark Sugden, Ilkley, United Kingdom

[73] Assignee: Switched Reluctance Drives, Ltd., Harrogate, United Kingdom

[21] Appl. No.: 480,860

[22] Filed: Jun. 7, 1995

[30]  Foreign Application Priority Data

Mar. 28, 1995 [GB] United Kingdom ............ 9506338

[51] Int. Cl.$^6$ ........................................... H03M 1/22
[52] U.S. Cl. ................... 341/9; 341/1; 341/2; 341/3; 341/11; 318/701
[58] Field of Search ..................... 341/1, 2, 3, 11, 341/9; 123/414, 612; 318/701

[56]  References Cited

U.S. PATENT DOCUMENTS

| 4,494,509 | 1/1985 | Long | 123/416 |
|---|---|---|---|
| 4,494,518 | 1/1985 | Katayama et al. | 123/612 |
| 4,507,590 | 3/1985 | Miyazakil | 318/254 |
| 4,532,461 | 7/1985 | Crook | 318/254 |
| 4,855,734 | 8/1989 | Elsdoerfer | 340/870.31 |
| 4,896,088 | 1/1990 | Jahns | 318/696 |
| 4,896,089 | 1/1990 | Kliman et al. | 318/701 |
| 4,914,437 | 4/1990 | Kibrick et al. | 341/3 |
| 5,198,738 | 3/1993 | Blaser et al. | 318/652 |
| 5,283,740 | 2/1994 | Sato et al. | 364/424.05 |

FOREIGN PATENT DOCUMENTS

| 0 378 351A2 | 1/1990 | European Pat. Off. | H03M 1/22 |
|---|---|---|---|
| 0 378 351A3 | 1/1990 | European Pat. Off. | H03M 1/22 |
| A-048 751 | 5/1992 | European Pat. Off. | |
| A-2 226 196 | 10/1993 | United Kingdom . | |
| WO 90/00325 | 1/1990 | WIPO | H02P 6/02 |

OTHER PUBLICATIONS

Stephenson and Blake, *The Characteristics, Design and Applications of Switched Reluctance Motors and Drives*, (Jun. 1993, Nuremberg, Germany).

*Primary Examiner*—Jeffrey A. Gaffin
*Assistant Examiner*—Jason L. W. Kost
*Attorney, Agent, or Firm*—Arnold, White & Durkee

[57] ABSTRACT

A sensor failure detection circuit for a position encoder, the sensor failure detection circuit receiving from a first set of at least one position sensor position signals which change state at a high resolution and from a second set of at least one position sensor position signals which change state at a lower resolution, the detection circuit monitoring a count for the position signals at the high resolution between states of the position signals at the lower resolution and comparing the count with a predetermined range which represents an expected count for the position signals at the high resolution between the states of the position signals at the lower resolution.

21 Claims, 13 Drawing Sheets

POSITION ENCODER

FIELD OF THE INVENTION

The present invention generally relates to a position encoder and, in particular, to a position encoder for use in a switched reluctance drive.

BACKGROUND OF THE INVENTION

In general, a reluctance machine can be operated as an electric motor in which torque is produced by the tendency of its movable part to move into a position where the reluctance of a magnetic circuit is minimized, i.e. the inductance of the exciting winding is maximized.

In one type of reluctance machine the energization of the phase windings occurs at a controlled frequency. These machines may be operated as a motor or a generator. They are generally referred to as synchronous reluctance motors. In a second type of reluctance machine, circuitry is provided for detecting the angular position of the rotor and energizing the phase windings as a function of the rotor's position. This second type of reluctance machine may also be a motor or a generator and such machines are generally known as switched reluctance machines. The present invention is generally applicable to switched reluctance machines, including switched reluctance machines operating as motors or generators.

FIG. 1 shows the principal components of a switched reluctance drive system 10 for a switched reluctance machine operating as a motor. The input DC power supply 11 can be either a battery or rectified and filtered AC mains. The DC voltage provided by the power supply 11 is switched across the phase windings of the motor 12 by a power converter 13 under the control of the electronic control unit 14. The switching must be correctly synchronized to the angle of rotation of the rotor for proper operation of the drive 10. As such, a rotor position detector 15 is typically employed to supply signals corresponding to the angular position of the rotor. The output of the rotor position detector 15 may also be used to generate a speed feedback signal.

The rotor position detector 15 may take many forms. In some systems, the rotor position detector 15 can comprise a rotor position transducer that provides output signals that change state each time the rotor rotates to a position where a different switching arrangement of the devices in the power converter 13 is required. In other systems, the rotor position detector 15 can comprise a relative position encoder that provides a clock pulse (or similar signal) each time the rotor rotates through a preselected angle.

In systems where the rotor position detector 15 comprises a rotor position transducer, failure of the rotor position transducer circuitry to properly provide output signals representative of the angular position of the rotor can seriously degrade the performance or, in the worst case, render the motor inoperable. In some circumstances, a controller 14 attempting to control a machine based on faulty rotor position transducer outputs could potentially damage both the machine and the remainder of the control circuitry.

The importance of accurate signals from the rotor position detector 15 may be explained by reference to FIGS. 2 and 3. FIGS. 2 and 3 explain the switching of a reluctance machine operating as a motor.

FIG. 2 generally shows a rotor pole 20 approaching a stator pole 21 according to arrow 22. As illustrated in FIG. 2, a portion of a complete phase winding 23 is wound around the stator pole 21. As discussed above, when the portion of the phase winding 23 around stator pole 21 is energized, a force will be exerted on the rotor tending to pull rotor pole 20 into alignment with stator pole 21.

FIG. 3 generally shows the switching circuitry in power converter 13 that controls the energization of the portion of the phase winding 23 around stator pole 21. When power switching devices 31 and 32 are switched ON, phase winding 23 is coupled to the source of DC power and the phase winding is energized.

In general, the phase winding is energized to effect the rotation of the rotor as follows: At a first angular position of the rotor (called the turn-ON angle), the controller 14 provides switching signals to turn ON both switching devices 31 and 32. When the switching devices 31 and 32 are ON the phase winding is coupled to the DC bus which causes an increasing magnetic flux to be established in the motor. It is this magnetic flux pulling on the rotor poles that produces the motor torque. As the magnetic flux in the machine increases, electric current flows from the DC supply provided by the DC bus through the switches 31 and 32 and through the phase winding 23. In some controllers, current feedback is employed and the magnitude of the phase current is controlled by chopping the current by switching one or both of switching devices 31 and/or 32 on and off rapidly.

In many systems, the phase winding remains connected to the DC bus lines (or connected with chopping if chopping is employed) until the rotor rotates such that it reaches what is referred to as the rotor "freewheeling angle." When the rotor reaches an angular position corresponding to the freewheeling angle (position 24 in FIG. 2) one of the switches, for example 31, is turned OFF. Consequently, the current flowing through the phase winding will continue to flow, but will now flow through only one of the switches (in this example 32) and through only one of the return diodes (in this example 34). During the freewheeling period there is little voltage differential across the phase winding, and the flux remains substantially constant. The motor system remains in this freewheeling condition until the rotor rotates to an angular position known as the "turn-OFF" angle (represented by position 25 in FIG. 2). When the rotor reaches the turn-OFF angle, both switches 31 and 32 are turned-OFF and the current in phase winding 23 begins to flow through diodes 33 and 34. The diodes 33 and 34 then apply the DC voltage from the DC bus in the opposite sense, causing the magnetic flux (and therefore the phase current) in the machine to decrease.

The energization of the phase windings in a switched reluctance motor depends heavily on accurately detecting the angular position of the rotor. If the rotor position detector fails and the controller continues to energize the phase windings, dangerously high currents could build up in the motor, potentially damaging the motor and the controller. Moreover, when a drive system fails, it is often necessary to test various control and motor components to find the failed elements. It would be beneficial to have an indicator that specifically indicates that the failure of the motor was the result of a rotor position detector failure so that unnecessary testing and debugging is not attempted. While some complicated rotor position detectors have some fault indicating circuits, such encoders are relatively expensive and require additional hardware for proper operation. Known position decoders do not provide a low cost, compact rotor position detector that provides an indication when the rotor position detector has failed.

In addition to problems with detecting sensor errors, known encoder systems for switched reluctance machines are often limited because of the costly electronics required to rapidly process digital signals provided by an incremental position encoder such that the phase energization occurs at the appropriate times. For example, in known systems, an incremental position encoder may be used that provides a relatively large number of digital clock pulses each complete revolution of the rotor. In systems that do not use costly electronic circuits or high speed microprocessors, it is often difficult and expensive to process the large number of digital pulses provided by the incremental encoder to properly synchronize the energization of the phase windings with the angular position of the rotor.

It is an object of the present invention to overcome the above described and other disadvantages of known position detectors and to provide a relatively inexpensive rotor position detector that provides an indication when a fault has occurred without the need for complex or expensive additional circuitry. Moreover, the present invention provides a rotor position encoder including an incremental and an absolute encoder and a method for efficiently controlling phase energization through the use of a repeating incremental position signal that comprises digital pulses of a number that is greater than the total number of changes of state that occur in the absolute encoder for each revolution. The use of this repeating signal from the incremental encoder allows for the construction of a low cost, efficient motor controller.

SUMMARY OF THE INVENTION

The present invention extends to a low cost, efficient, control system that includes an improved rotor position detector that includes one set of sensors using one resolution and a second set of sensors using a second resolution. In accordance with one embodiment of the present invention, the first set is used to confirm correct operation of the second set. Each set of sensors in the present invention may consist of one or more sensors.

In accordance with one embodiment of the present invention, a sensor failure detector is provided that receives, from a first set of position sensors, position signals which change state at a high resolution and, from a second set of position sensors, position signals which change state at a lower resolution. The detection circuit monitors a count for the position signals at the high resolution between the states of the position signals at the lower resolution and compares the count with a predetermined value which represents an expected count for the position signals at the high resolution between the states of the lower resolution position signals. Any significant difference between the sensed count and the suggested count indicates an error in one of the sensors. In this manner, a sensor failure detection circuit in accordance with the present invention can detect a sensor failure for a position encoder of a switched reluctance machine.

BRIEF DESCRIPTION OF THE DRAWINGS

Other aspects and advantages of the present invention will become apparent upon reading the following detailed description of exemplary embodiments and upon reference to the drawings in which.

Similar reference characters indicate similar parts throughout the several views of the drawings.

DETAILED DESCRIPTION OF THE INVENTION

Illustrative embodiments of the invention are described below as they might be implemented using the sensor failure detection circuitry to effectively detect the failure of a sensor of a position encoder of a switched reluctance drive system. In the interest of clarity, not all features of an actual implementation are described in this specification. It will of course be appreciated that in the development of any such actual implementation (as in any development project), numerous implementation-specific decisions must be made to achieve the developers' specific goals and subgoals, such as compliance with system and business related constraints, which will vary from one implementation to another. Moreover, it will be appreciated that such a development effort might be complex and time-consuming, but would nevertheless be a routine undertaking of device engineering for those of ordinary skill having the benefit of this disclosure.

Figure 1:
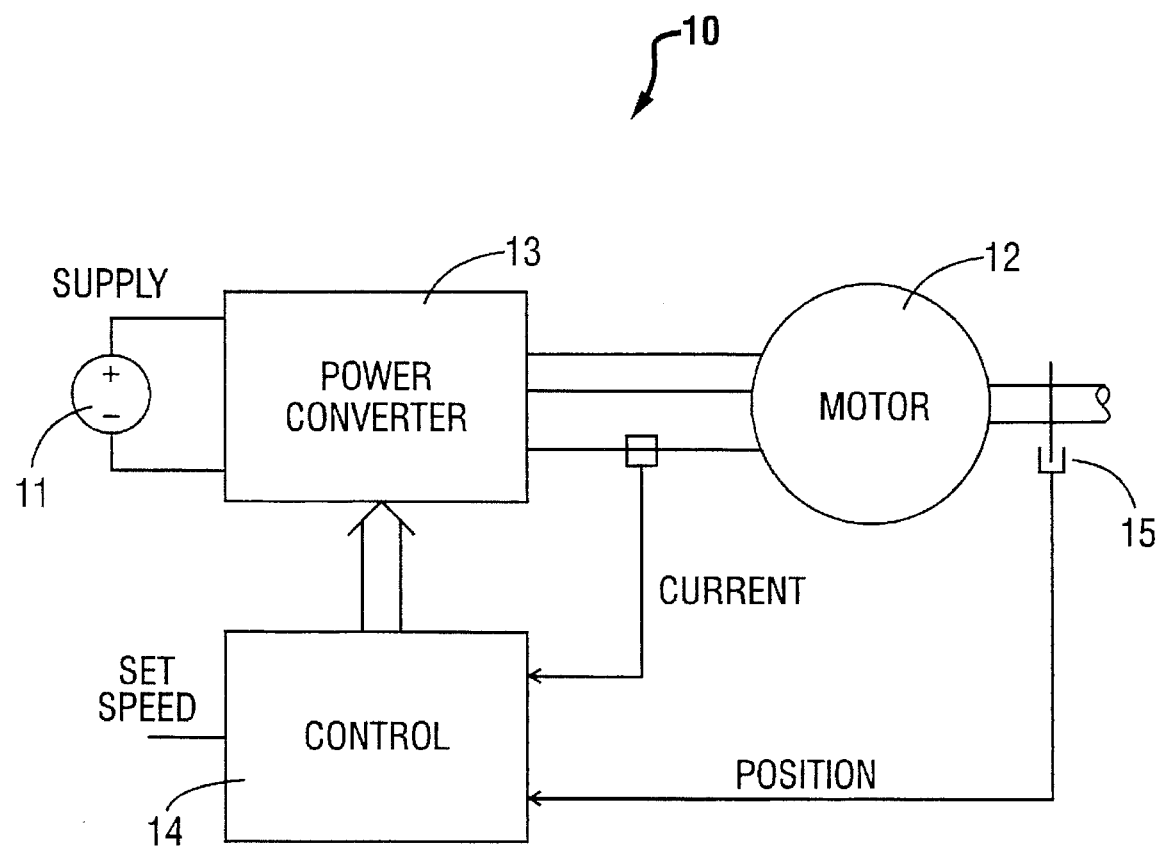
FIG. 1 shows the principal components of a switched reluctance drive system.
Figure 2:
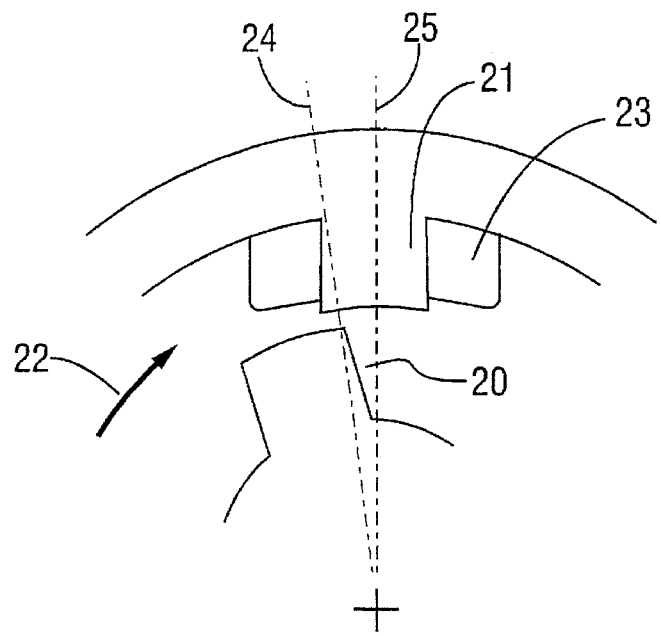
FIG. 2 shows a rotor pole approaching a stator pole and the commutation points for the portion of the phase winding associated with the stator pole.
Figure 3:
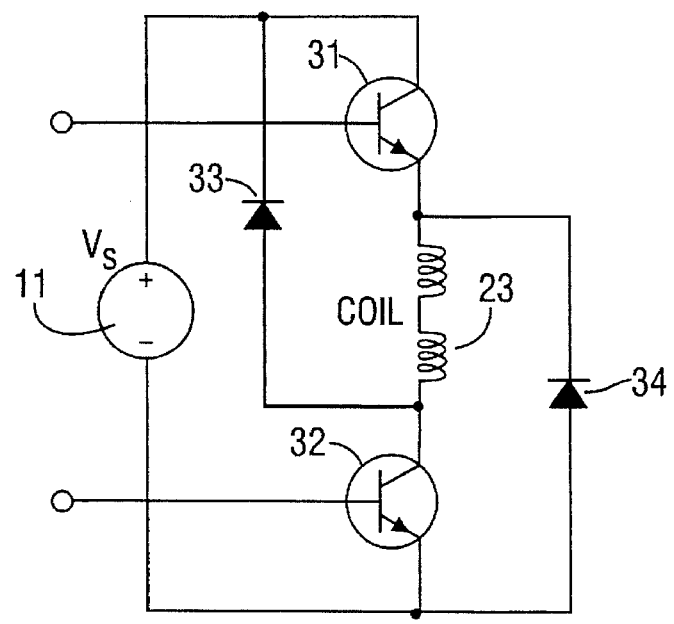
FIG. 3 generally shows the switching circuitry in a power converter that controls the energization of the portion of the phase winding associated with the stator pole of FIG. 2.
Figure 4:
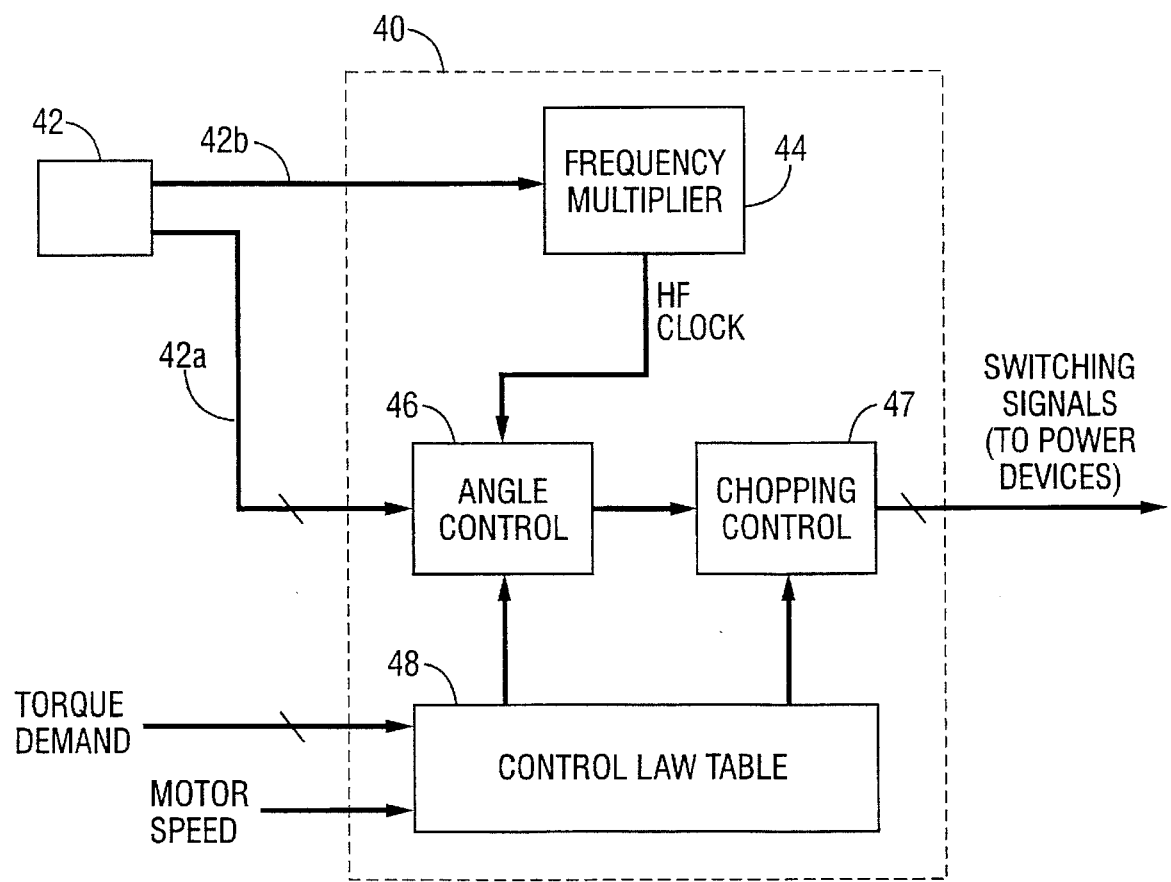
FIG. 4 illustrates an improved control system and position encoder for controlling the operation of a switched reluctance drive.

In general, the present invention comprises an improved control system and position encoder for controlling the operation of a switched reluctance machine as illustrated generally in FIG. 4. Referring to FIG. 4, the system comprises a controller 40 that receives signals corresponding to the angular position of the rotor from rotor position encoder 42. In response to the signals from encoder 42, the controller 40 generates switching signals (or firing signals) that determine the switching state of the power switching devices (not illustrated in FIG. 4) that control energization of the phase windings.

In the embodiment of FIG. 4, the signals provided by encoder 42 to the controller 40 comprise two sets: a first set 42a and a second set 42b. The signals that comprise the first set 42a are of a first resolution that corresponds to the absolute position of the rotor in that the signals from set 42a may be used to define the actual rotor position within any span of 360 electrical degrees. The signals that comprise the second set 42b are of a second resolution that corresponds to the incremental position in that the signals that comprise set 42b provide an integral number of pulses per revolution which indicate the relative movement of the rotor but give no indication of its absolute position. In the embodiment of FIG. 4, the resolution of the first set is less than the resolution of the second set and the output signals from encoder 42 that comprise the first and second sets 42a–b comprise a series of digital pulses.

Figure 5A:
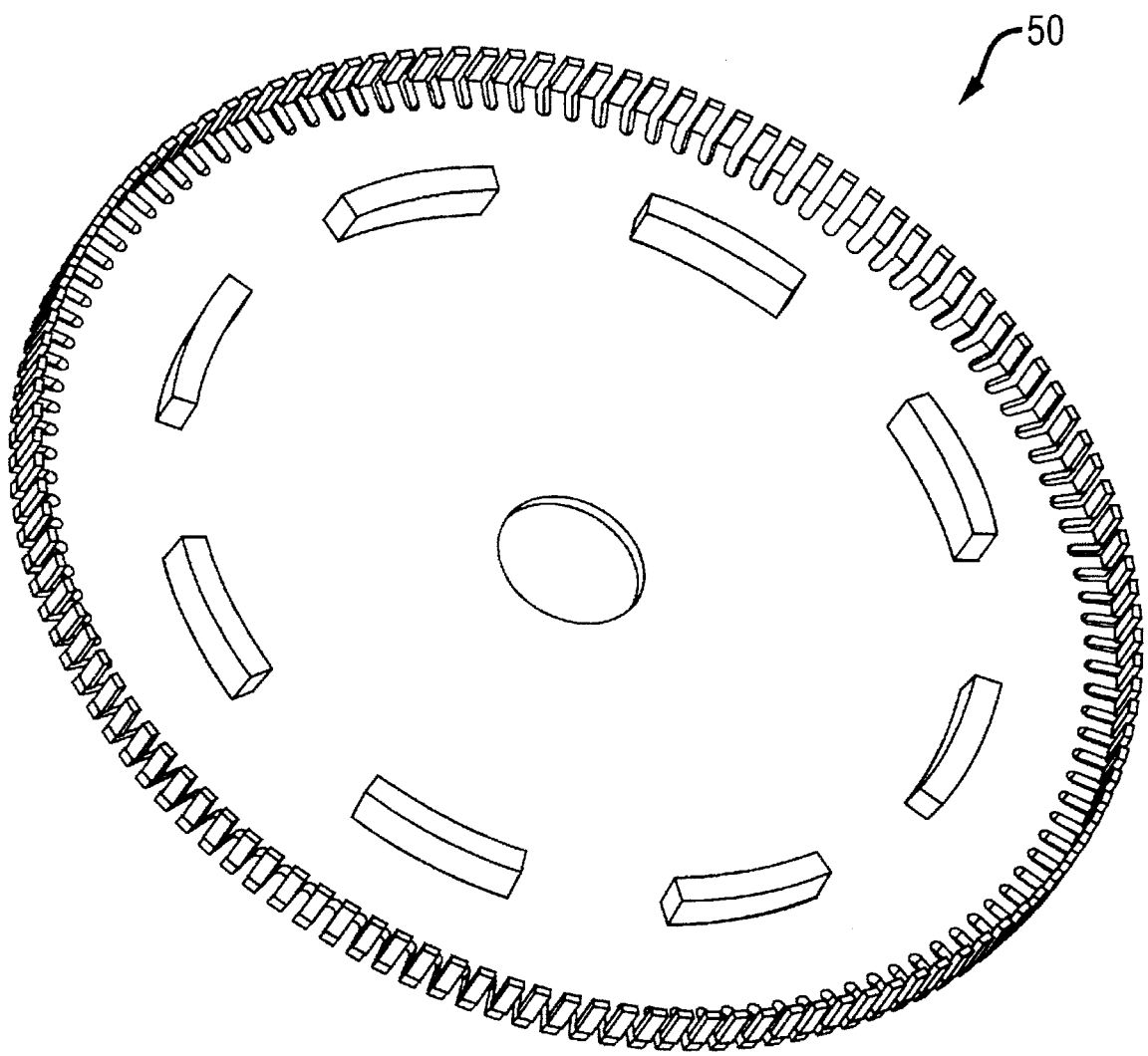
FIGS. 5a–5c illustrate in greater detail the construction of the encoder of FIG. 4.
Figure 5B:
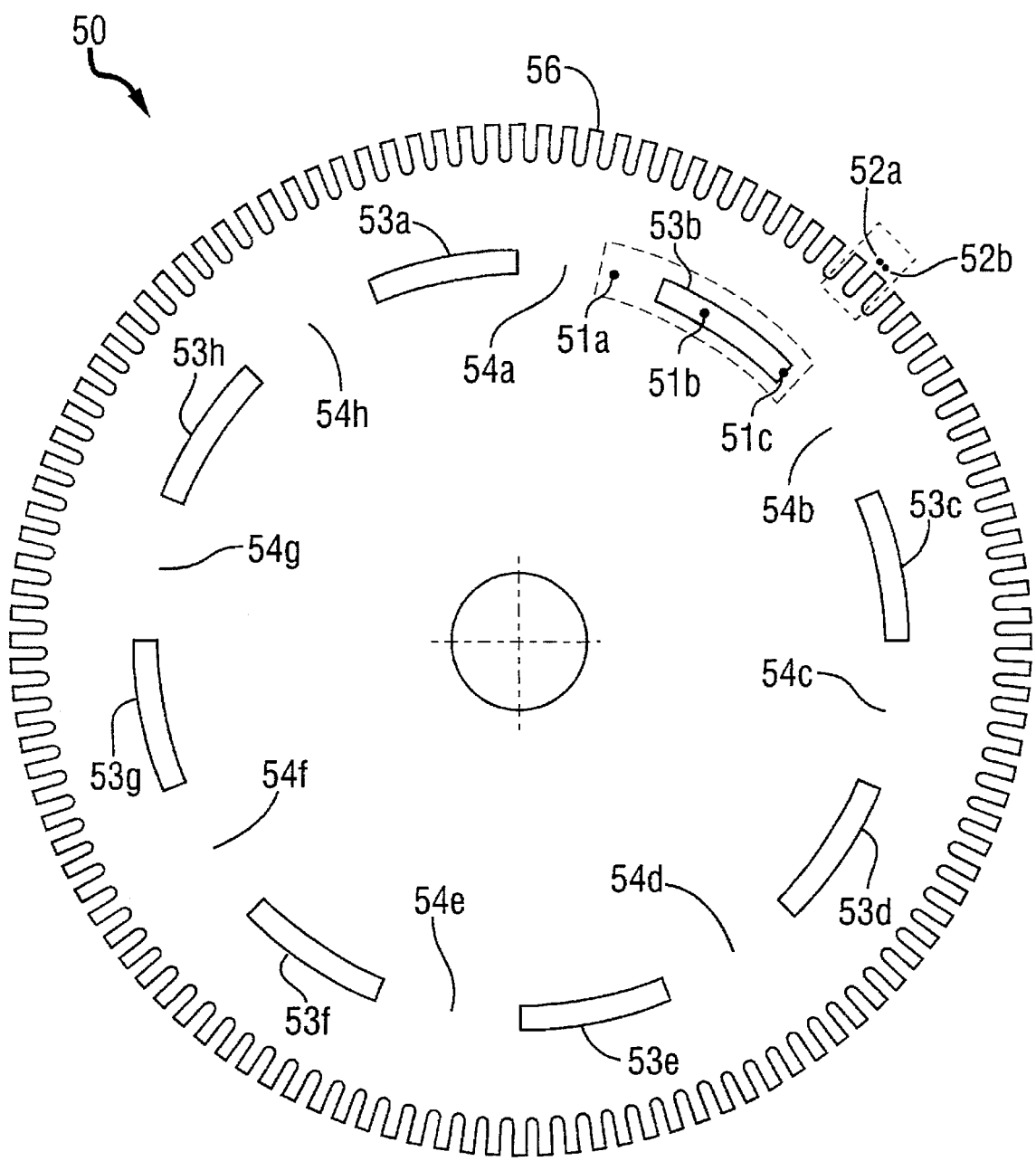
Figure 5C:
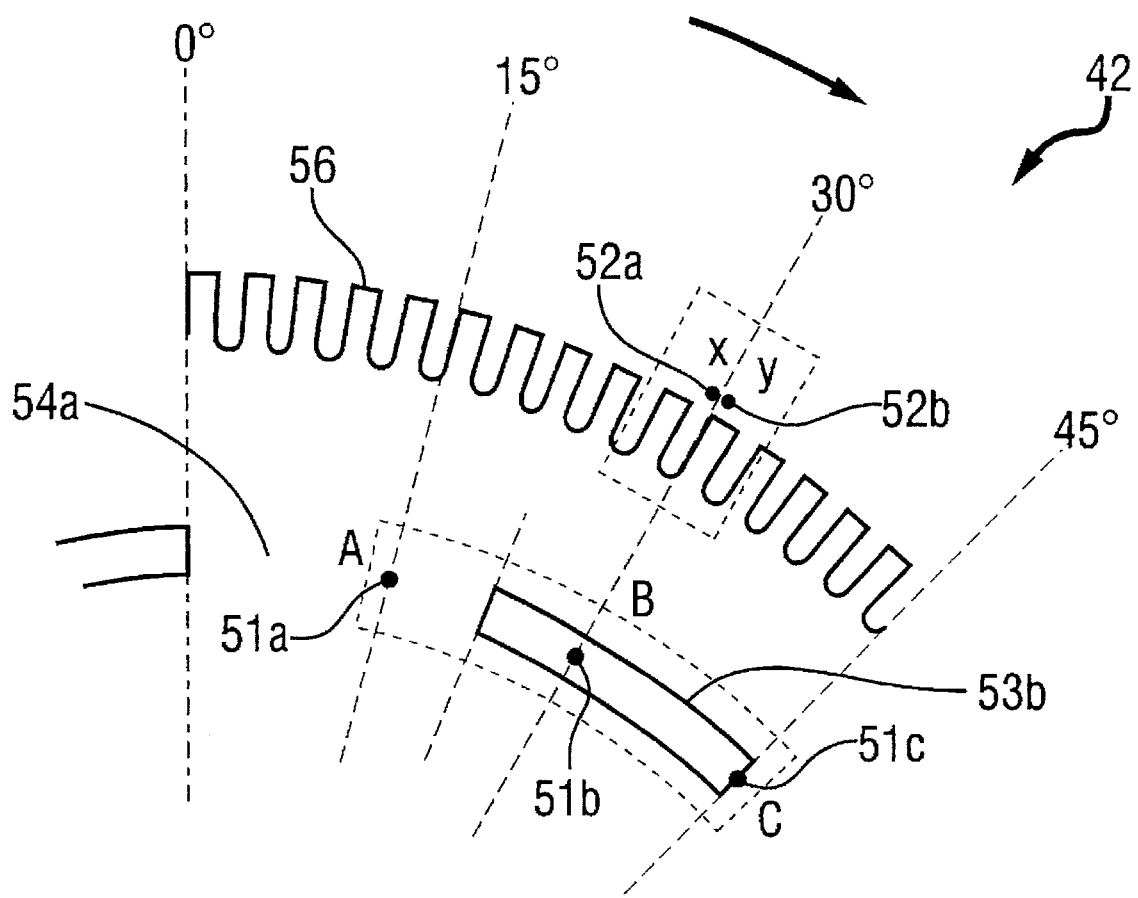

FIGS. 5a–5c illustrate in greater detail the construction of encoder 42. In the embodiment of FIGS. 5a–5c, the encoder 42 comprises a cup-vane 50 and sensors 51a, 51b and 51c and 52a and 52b. FIG. 5a provides a perspective view of a cup-vane 50. FIGS. 5b and 5c illustrate cup-vane 50 in greater detail and show the positioning of sensors 51a–c and 52a–b in accordance with the present invention.

Referring to FIG. 5b, cup-vane 50 comprises a dual resolution cup-vane that includes two sets of teeth 53 and 56. The first set of teeth 53 includes eight projecting teeth 53a–h that define eight light inhibiting regions corresponding to teeth 53a–h (referred to herein as "mark" regions) and eight light transmissive regions 54a–h (referred to as "space" regions). In the embodiment of FIG. 5, the teeth 53a–h are all of the same width and are sized such that the angular expanse of the mark regions is substantially equal to the angular expanse of the space regions.

FIGS. 5b and 5c illustrate how the first set of teeth 53 may be used to provide a digital encoder of a first resolution that provides signals indicative of the absolute position of the rotor relative to the stator. Referring to FIG. 5b, three sensors 51a–51c are used in conjunction with the cup-vane 50 to provide the first set of digital signals. In the embodiment of FIGS. 5a–5c, the three sensors 51a–51c comprise slotted optical sensors that are positioned substantially 15° degrees apart as is illustrated in FIG. 5c. The optical sensors 51a–51c are further positioned such that they receive the eight teeth 53a –h. In operation, each of the three sensors 51a–51b provides a digital signal of a first logic level (e.g., logic "1") when one of the teeth 53a–h is in the slot associated with that sensor and provides a digital signal of a second logic level (e.g., logic "0") when the slot associated with that sensor is empty. Accordingly, as the teeth 53a–h rotate past the sensors 51a–51c, the outputs from the sensors together provide an indication of the absolute position of the rotor.

Referring back to FIG. 5b, it may be noted that the cup-vane 50 also includes a second set of teeth 56. In the embodiment of FIGS. 5a–5c, the second set of teeth 56 comprises one-hundred and twenty teeth of equal width that are sized to provide one-hundred and twenty light inhibiting regions (referred to as "mark" regions") and one-hundred twenty light transmissive regions (referred to as "space" regions).

FIGS. 5b and 5c illustrate how the second set of teeth 56 may be used to provide a digital encoder of a second resolution that provides signals indicative of the incremental position of the rotor. Referring to FIG. 5b, two sensors 52a and 52b are used in conjunction with the cup-vane 50 to provide the second set of digital signals. In the embodiment of FIGS. 5a–5c, the two sensors 52a–52b comprise slotted optical sensors that are positioned substantially 0.75° degrees apart as is illustrated in FIG. 5c. The optical sensors 52a–52b are further positioned to receive the one-hundred and twenty teeth that comprise the second set of teeth 56. The sensors 52a and 52b operate in a manner similar to that of sensors 51a–51c described above. By monitoring the outputs of sensors 52a and 52b in the manner described below it is possible to generate a digital pulse each time the rotor rotates through a 0.75° high resolution increment of rotation. The digital pulses that are provided from this monitoring of sensors 52a and 52b constitute an example of a second set of signals of a second resolution.

It should be noted that the particular encoder 42 illustrated in FIGS. 5a–5c is exemplary only and that the present invention is applicable to other types and configurations of vanes, sensors and to other forms of position encoders. For example, the number of teeth per set could be changed, as could the number and location of the sensors without departing from the scope of the present invention. Moreover, it is not essential that a cup-vane be used or that the vane define light inhibiting and light transmissive portions. Other types of vanes and sensors could be used. For example, the vane could be constructed of magnetic mark regions and non-magnetic space regions and the sensors could comprise Hall-effect devices. Similarly the vane could comprise teeth of ferromagnetic material and the sensors could each be a form of reluctance sensor. Other means of deriving the digital signals include regions of capacitance or inductance that vary and a suitable sensor to detect the changes. Also, light reflectance variations instead of regions of varying light transmissivity could be used. Accordingly, the present invention is not limited to the specific encoder illustrated in FIGS. 5a–5c but can apply to other encoders that produce a first set of signals of a first resolution and a second set of signals of a second resolution.

Referring to FIG. 4, the controller 40 of the present invention receives the two sets of output signals from encoder 42 and utilizes those signals to control the switching of power devices to control the energization of the phase windings of a switched reluctance machine. It may be noted that the second set of digital output signals 42b from encoder 42 is provided to a frequency multiplier 44. Frequency multiplier 44 receives the second set of signals of the second resolution from encoder 42 and generates a high frequency clock signal (HF clock) that is used by angle controller 46 to control energization of the phase windings of the machine. Although not illustrated in FIG. 4, embodiments are envisioned where frequency multiplier 44 receives the first set of signals from encoder 42 and generates the HF clock from the first set of signals.

Figure 6A:
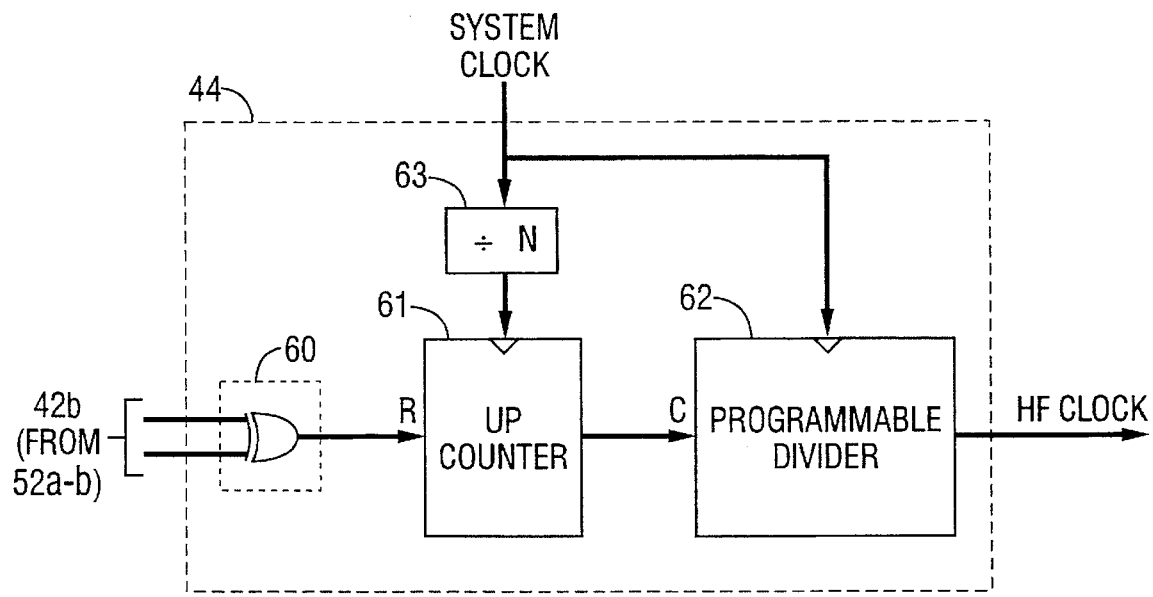
FIGS. 6a–6b provide examples of circuitry that may be used to implement the frequency multiplier of FIG. 4.
Figure 6B:
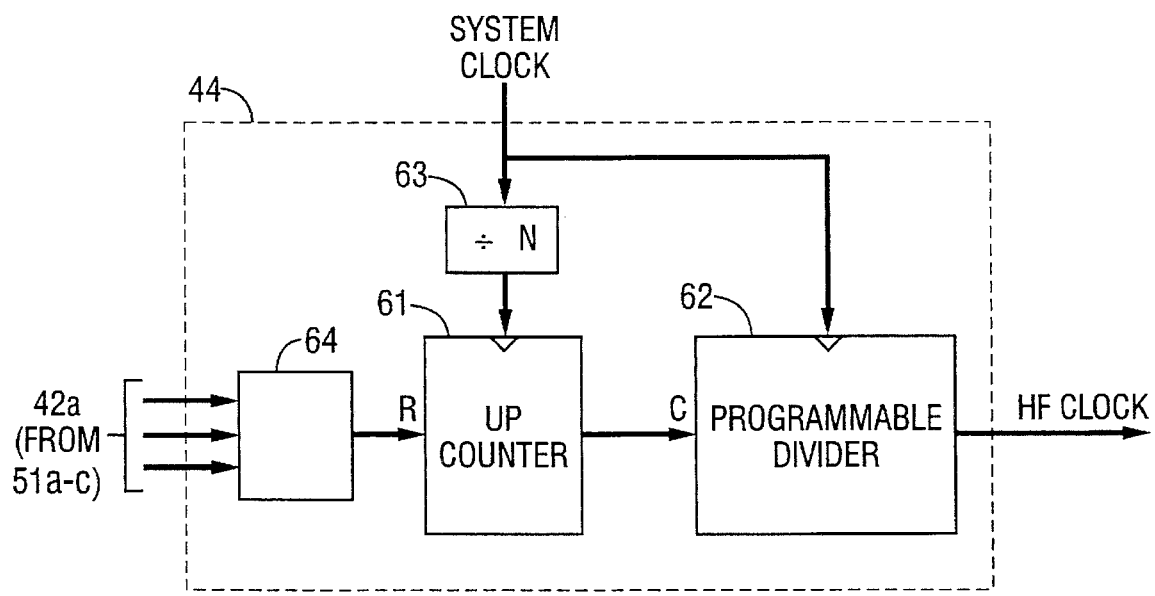

FIGS. 6a–6b provide examples of circuitry that may be used to implement the frequency multiplier 44 of FIG. 4. FIG. 6a illustrates circuitry that may be used when the second set of signals from encoder 42 is provided to frequency multiplier 44. FIG. 6b illustrates circuitry that may be used when the first set of signals 42a from encoder 42 is provided to frequency multiplier 44.

Referring to FIG. 6a, the second set of digital signals 42b is applied to an increment detector 60 that monitors the signals from sensors 52a and 52b and produces a signal that changes state when the rotor has rotated a predetermined high resolution increment of rotation. In the embodiment of FIG. 6 an increment detector 60 comprises an exclusive OR (XOR) gate. The output from increment detector 60 is a series of clock pulses where each clock pulse corresponds to a high resolution increment of rotation of the rotor. The series of clock pulses from increment detector 60 is applied to the Reset input of an eight bit up-counter 61. Accordingly, up-counter 61 receives the series of digital pulses derived from sensors 52a and 52b that consists of a predetermined number of pulses for each complete rotation of the rotor. The clock input of eight bit up-counter 61 is coupled to the system clock through a ÷N divider 63, where N is an integer, having the value 4 in this example. The system clock may have a frequency that is very high with respect to the frequency of the digital pulses that comprise the second set of digital signals provided by encoder 42. In operation, the up-counter 61 is reset each time a rising or falling edge of a pulse occurs in the second set of digital signals provided by encoder 42. The up-counter 61 will then count up in response to the divided system clock to provide a clocked output that corresponds to the angular speed of the rotor. For example, if the rotor is rotating at a first speed (e.g., a relatively slow speed) the counter 61 will be reset relatively infrequently and thus the maximum count of counter 61 will be relatively high. If the angular speed of the rotor increases to a second speed, counter 61 will be reset on a more frequent basis and thus the maximum output of counter 61 will relatively low. In general, the output of counter 61 will be an eight bit maximum count value that corresponds inversely to the speed of the motor. The maximum output of the counter 61 may be provided to the to the programmable divider 62 in response to a pulse in the second of digital signals provided by encoder 42.

The eight-bit digital output from up-counter 61 is applied to the Control input of a programmable divider 62. Programmable divider 62 receives as its Clock input the system clock. As those skilled in the art will recognize, programmable divider 62 is of standard construction and provides an output clock signal that has a frequency that is a fraction of the frequency of the signal applied at its Clock. In the embodiment of FIGS. 6a–6b, the programmable divider is of the type where the output clock frequency is equal to the input clock frequency divided by the number represented by the eight-bit digital word received at the Control input. Accordingly, the programmable divider 62 provides a high frequency digital clock signal (HF clock) that has a frequency that varies proportionally with the frequency of the digital pulses that comprise the second set of signals from encoder 42. Since the frequency of the digital pulses that comprise the second set of signals from encoder 42 varies proportionally with the speed of the motor, the HF clock signal has a frequency that varies proportionally with the speed of the motor.

Although not shown in FIGS. 6a–6b, in embodiments where the frequency of the divided system clock is such that up-counter 61 would likely overflow between successive clock pulses from encoder 42, the number of bits of the up-counter 61 may be increased accordingly.

FIG. 6b illustrates circuitry for implementing frequency multiplier 44 when the first set of signals 42a from encoder 42 is provided to the frequency multiplier 44. The circuitry of FIG. 6b operates in a manner similar to that described above with respect to FIG. 6a with the exception that the counter 61 is reset each time the rotor rotates through an increment of rotation as reflected by signals 42a.

Logic circuitry 64 monitors the signals 42a and provides a clock pulse each time the signals comprising set 42a change state. When the circuitry of FIG. 6b is utilized, the high resolution pulse train 42b from encoder 42 is unnecessary for a functioning motor drive. In such embodiments a simple RPT, providing only one pulse train, could be used.

Referring back to FIG. 4, the HF clock signal from the frequency multiplier 44 is applied to an angle control circuit 46 and a chopping control circuit 47. In general, the angle control circuit 46 and chopping control circuit 47 respond to the HF clock and to the signals from encoder 42 to provide switching signals for the power devices. The chopping controller 47 may be used at relatively low angular speeds when chopping methods are effective for controlling the current in the phase windings, and angle controller 46 may be employed when the speed of the motor is relatively high and chopping control is ineffective. In general, the angle controller 46 and chopping controller 47 receive digital rotor position signals derived from encoder 42 and compare the rotor position signals from the encoder 42 with signals corresponding to turn-ON and turn-OFF angles for the desired operating conditions. When the appropriate controller determines that the rotor is at the position corresponding to the turn-ON angle, a switching signal is generated for the appropriate power device to energize the appropriate phase winding. When the rotor position signals derived from encoder 42 indicate that the rotor is at the position corresponding to the turn-OFF angle, the appropriate controller generates a switching signal to turn off the appropriate switching device and de-energize the appropriate phase winding. If chopping control is used, the controller 47 may generate chopping signals between the period defined by the turn-ON and turn-OFF angles to control the current in the phase winding.

These techniques are well-known to those skilled in the technology of switched reluctance drives.

In the embodiment of FIG. 4, the turn-ON and turn-OFF information is provided by a control law table 48 that includes as its inputs signals representing the torque-demand and the actual speed of the motor. In the embodiment of FIG. 4, the control law table 48 may comprise a look up table that includes a pre-interpolated matrix in an EPROM containing appropriate turn-ON and turn-OFF data for several speed/torque-demand combinations. This turn-ON and turn-OFF data may be empirically derived or calculated. Alternate embodiments are envisioned wherein the control law table 48 comprises a sparse matrix and a microprocessor or ASIC is used to calculate the appropriate turn-ON and turn-OFF angles in real time.

Figure 7A:
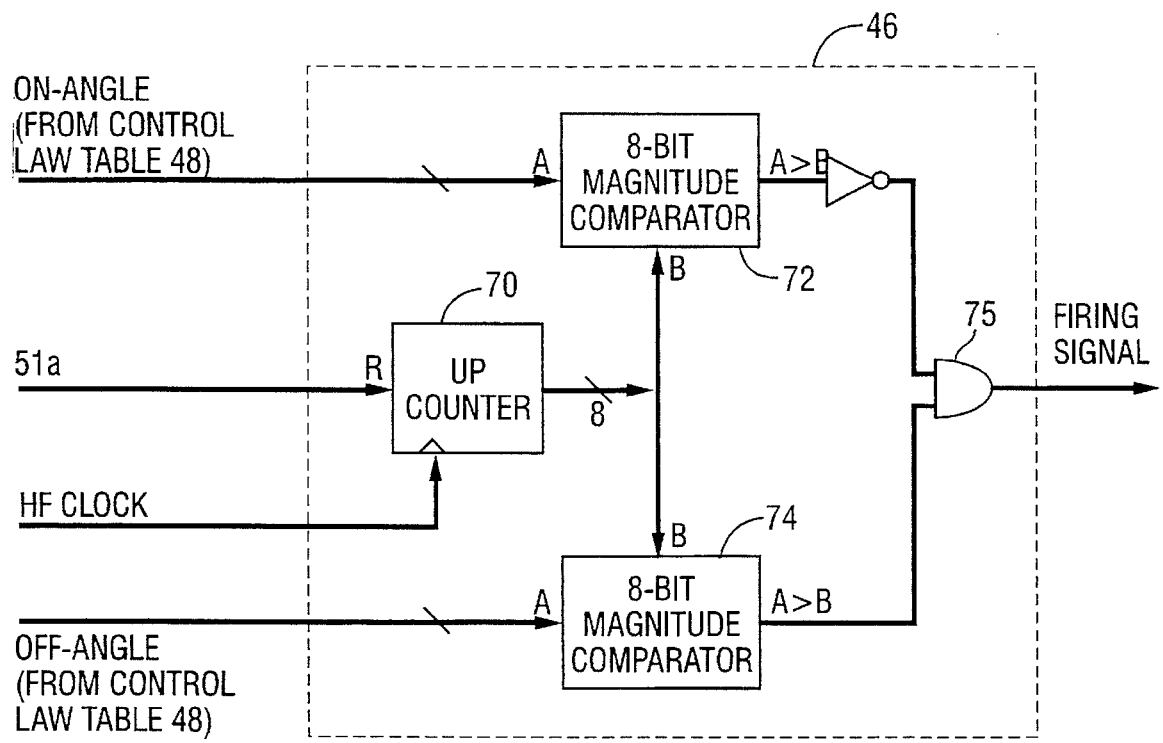
FIGS. 7a and 7b generally illustrate an example of the circuitry that may be used to implement the angle controller of FIG. 4 and the signals transmitted to and generated by the angle controller.

FIG. 7a generally illustrates an example of the circuitry that may be used to implement the angle controller 46 of FIG. 4. As illustrated in FIG. 7a, angle controller 46 may comprise an eight-bit up counter 70 that receives as its Clock input the HF clock signals discussed above in connection with FIG. 6. As indicated, the HF clock signal comprises a series of clock pulses that occur at a frequency that is proportional to the angular speed of the rotor. The Reset input of up-counter 70 is coupled to the pulse train 51a.

Referring to FIG. 7a, the eight-bit counter 70 is reset each time an edge occurs in the pulse train 51a. In the embodiment of FIG. 7a, the up-counter 70 is reset on each rising edge, although embodiments are envisioned where counter 70 is reset on a falling edge. Because the counter 70 is reset at a point corresponding to an absolute position of a rotor pole relative to a stator pole, and because the counter 70 is clocked with an HF clock signal that varies in proportion to the speed of the rotor, the running output of up-counter 70 will be a digital word that increases over time, where the value of the digital word corresponds to the position of the rotor. This is illustrated generally by the Angle Control Ramp signal of FIG. 7b.

Figure 7B:
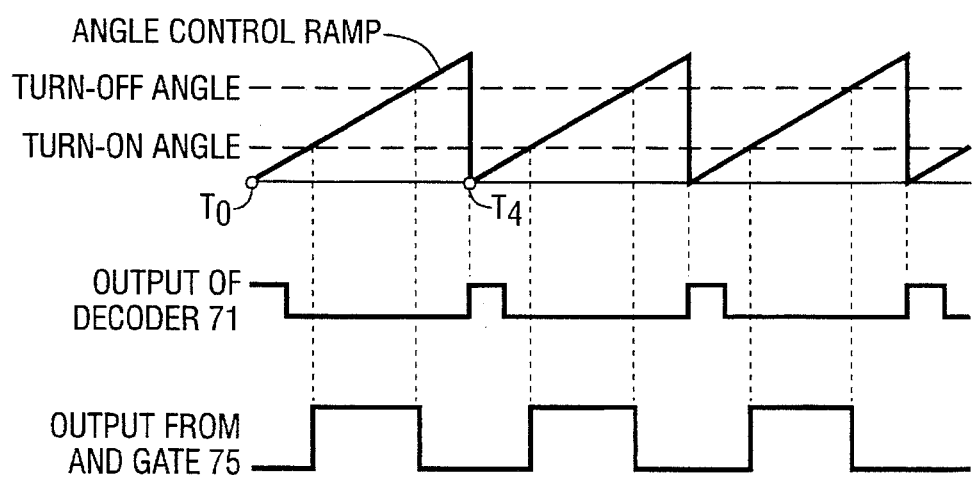

Referring to FIG. 7b, the output of the up-counter 70 is represented by the Angle Control Ramp. As FIG. 7b indicates, at a point in time $T_0$, counter 70 will receive a rising edge clock signal from decoder 71. This rising edge will reset counter 70 causing its output to drop to zero. As discussed above, the occurrence of this rising edge indicates that a rotor pole has reached an absolute position relative to a stator pole. After counter 70 is reset, its output will increase in response to each HF clock pulse until the next occurrence of a rising edge from pulse train 51a at time $T_4$. Because the HF clock pulse occurs at a rate that is proportional to the speed of the rotor, the output of the counter 70 will correspond to the position of the rotor. Referring back to FIG. 7a, the digital output from counter 70, which corresponds to rotor position, may be used to generate switching signals, or firing signals, to control the power devices to energize or de-energize the phase windings of interest. In particular, in FIG. 7a, an eight-bit comparator 72 is used to sense when the rotor has reached the turn-ON angle such that the appropriate switching device can be turned on. As illustrated in FIG. 7a, comparator 72 receives at its A input an eight-bit word from control law table 48 corresponding to the desired turn-ON point. Comparator 72 receives at its B input the running output from counter 70. In the embodiment of FIG. 7a, comparator 72 provides a logic high output whenever its A output exceeds its B input. Accordingly, the output of comparator 72 will be a logic high ("1") whenever the signal corresponding to the desired turn-ON angle exceeds the running output of counter 70 and logic low ("0") at all other times. This signal is inverted by inverter 73 to provide a digital signal that is logic high whenever the running output of counter 70 exceeds the signal representing the turn-ON angle.

In a similar manner comparator 74 receives at its A input a digital word from control law table 48 corresponding the desired turn-OFF angle and at its B input the running output of counter 70. Like comparator 72, comparator 74 produces an output signal that is logic high ("1") whenever the word at its A input exceeds the word at its B input. Accordingly, counter 74 will produce a digital signal that is logic low (0) whenever the output from counter 70 exceeds the signal corresponding to the turn-OFF angle.

The inverted output from comparator 72 and the output from comparator 74 are both applied to AND gate 75. Accordingly, AND gate 75 will provide a digital signal that is logic high only when the running output from counter 70 is greater than the signal representing the turn-ON angle and less than the signal representing the turn-OFF angle. This output signal from AND gate 75 can then be used to control the energization of an appropriate phase winding by circuitry not illustrated in FIG. 7a. The general operation of comparators 72 and 74 and AND gate 75 is illustrated in FIG. 7b where the Output from AND Gate 75 represents a series of pulses that can be used to control energization of the machine.

As those skilled in the art will appreciate, the exemplary control system of FIG. 7a is basic, and does not include circuitry for implementing more complicated control functions, such as freewheeling. Such additional functions may be easily added to the circuit of FIG. 7a (e.g. by adding another comparator) without departing from the spirit and scope of the present invention. Moreover, FIG. 7a illustrates control circuitry for only a single phase. The circuitry will generally be repeated for each phase of the motor and additional circuitry (not illustrated) will generally be required to change the edge which resets the angle control ramp from being reset on a rising edge to being reset on a falling edge when the drive moves from motoring to generating. For example, the circuitry of FIG. 7a could be repeated with up-counter 70 being reset from the pulse train from either sensor 51b or 51 c. Techniques and circuitry for extending the controller of FIG. 7a to multiphase motors will be apparent to those of ordinary skill in the art having the benefit of this disclosure. Further, the control circuit of FIG. 7a generally illustrates an angle controller. The controller could be modified to include a chopping circuit, which compares the actual current in the phase winding with a desired current during the interval between the turn-ON and turn-OFF angles, and chops the phase current whenever the actual current meets or exceeds the desired current.

The controller of FIG. 4 allows for effective control of a switched reluctance machine without costly absolute position encoders or costly processing circuitry. Accordingly, the controller of the present invention as represented by FIG. 4 provides a low cost, efficient control system.

In addition to providing the relatively efficient, low cost, controller of FIG. 4, the system of the present invention and, in particular, the use of an encoder that provides a first set of signals of a first resolution and a second set of signals of a second resolution, allows for the use of a novel sensor failure detection circuit to detect any failures of the sensor devices 51a–c and 52a–b.

In general, the sensor failure detection circuit of the present invention receives position signals at a first resolution from a first set of at least one position sensor and position signals at a second resolution from a second set of at least one position sensor. The detection circuit monitors the position signals from the first set of at least one position sensor and from the second set of at least one position sensor and detects a position sensor failure by analyzing the relationship between the position signals at the first resolution and the position signals at the second resolution.

Figure 8:
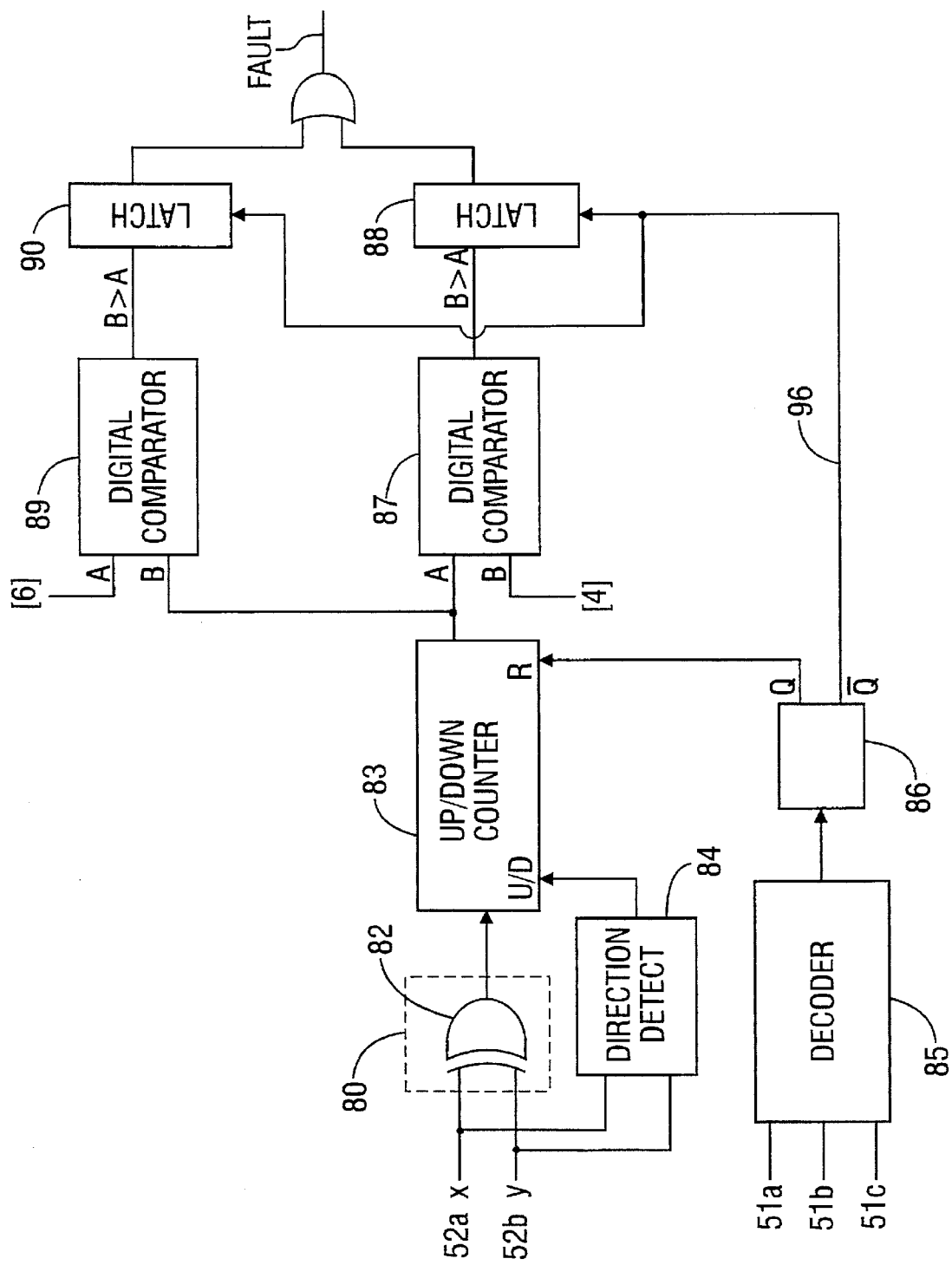
FIG. 8 shows an example of one embodiment of the sensor failure detection circuitry of the present invention.

FIG. 8 shows an example of one embodiment of the sensor failure detection circuitry of the present invention for one direction of rotation. As discussed above, the sensor failure detection circuit receives as its inputs the first set of outputs 42a from sensors 51a–c of encoder 42 and the second set of outputs 42b from sensors 52a–b of encoder 42.

The sensor failure detection circuitry receives the second set of outputs from sensors 52a–b of encoder 42 as two inputs to an increment detector 80, which determines whether the rotor has rotated a predetermined high resolution increment of rotation. In this embodiment, the increment detector 80 includes an XOR gate 82 which provides a pulse that changes state each time the outputs from sensors 52a–b indicate that the rotor has rotated through a predetermined high resolution increment. The output signal from XOR gate 82 clocks an up/down counter 83. In this manner up-down counter 83 keeps track of the number of high resolution increments of rotation for the rotor that have occurred since the reset of counter 83.

The second set of output signals from sensors 52a–b of encoder 42 are also input into a direction detector 84, which determines the direction of rotation for the rotor, and the output of the direction detector 84 is provided to the up/down input of the up/down counter 83, and controls the direction of counting.

The sensor failure detection circuit of FIG. 8 determines whether there is a failure in any of the sensors 51a–c or 52a–b by monitoring the number of high resolution increments that occur between each change in state of the low resolution sensors 51a–c. Accordingly, in the embodiment of FIG. 8 a decoder 85 is provided. Decoder 85 of FIG. 8 provides a digital pulse having a duration that is defined by successive changes in state of the outputs of sensors 51a–c. The output from decoder 85 is provided as an input to a buffer 86 which reflects the output from the decoder 85 at its Q output and provides the complement of the output of decoder 85 at its $\overline{Q}$ output.

The Q output of buffer 86 is applied to the Reset input of up/down counter 83 and is used to reset the counter each time a change in the state of the outputs of sensors 51a–c occurs that produces a logic high output from decoder 85. The counter will then count up (or down) and will provide a running output representing the accumulated number of high resolution increments of rotation for the rotor. Comparators 87 and 89 receive the running count from counter 83 and compare it to predetermined values representing a range of high resolution increments of rotation for the rotor that are expected between successive changes in the outputs of sensors 51a–c when all sensors are operating properly. In the embodiment of FIG. 8, these values are 4 and 6. These values are selected because each high increment of resolution, when sensors 52a and 52b are operating properly, causes increment detector 80 to generate a rising edge signal. Because the edge of a low-resolution pulse is not necessarily aligned with an edge of a high-resolution pulse (in practice the alignment is determined by the relative positions of the teeth of the vane 50 and the sensors), the number of high-resolution pulses which occur during a low-resolution pulse will vary during proper operation of the drive. In this embodiment, it will vary between 4 and 6. Comparator 87 compares the digital words at its inputs and produces a logic high output whenever the count from counter 83 is less than the expected lower value (i.e. in this embodiment 4 pulses). Similarly, Comparator 89 produces a logic high if the number of pulses is above the upper value (i.e. in this embodiment 6 pulses).

At the next state change of the first set of outputs from encoder 42 (i. e., the outputs from sensors 51a–c), the output from detector 85 will drop to logic low and triggers latches 88 and 90, which latch the output of the Comparators 87 and 89 respectively. If the output of either Comparator 87 or 89 is logic high (indicating that the number of high resolution pulses is outside the expected range than that expected, i.e., all sensors are not operational), the logic high output from either comparator 87 or 89 is latched into a latch 88 or 90 to produce a fault signal. If the output of the counter 83 is within the expected range, the comparators 87 and 89 both produce a logic low signal which is latched onto the latches 88 and 90 to provide a signal indicating that the sensors are functioning properly.

Figure 9:
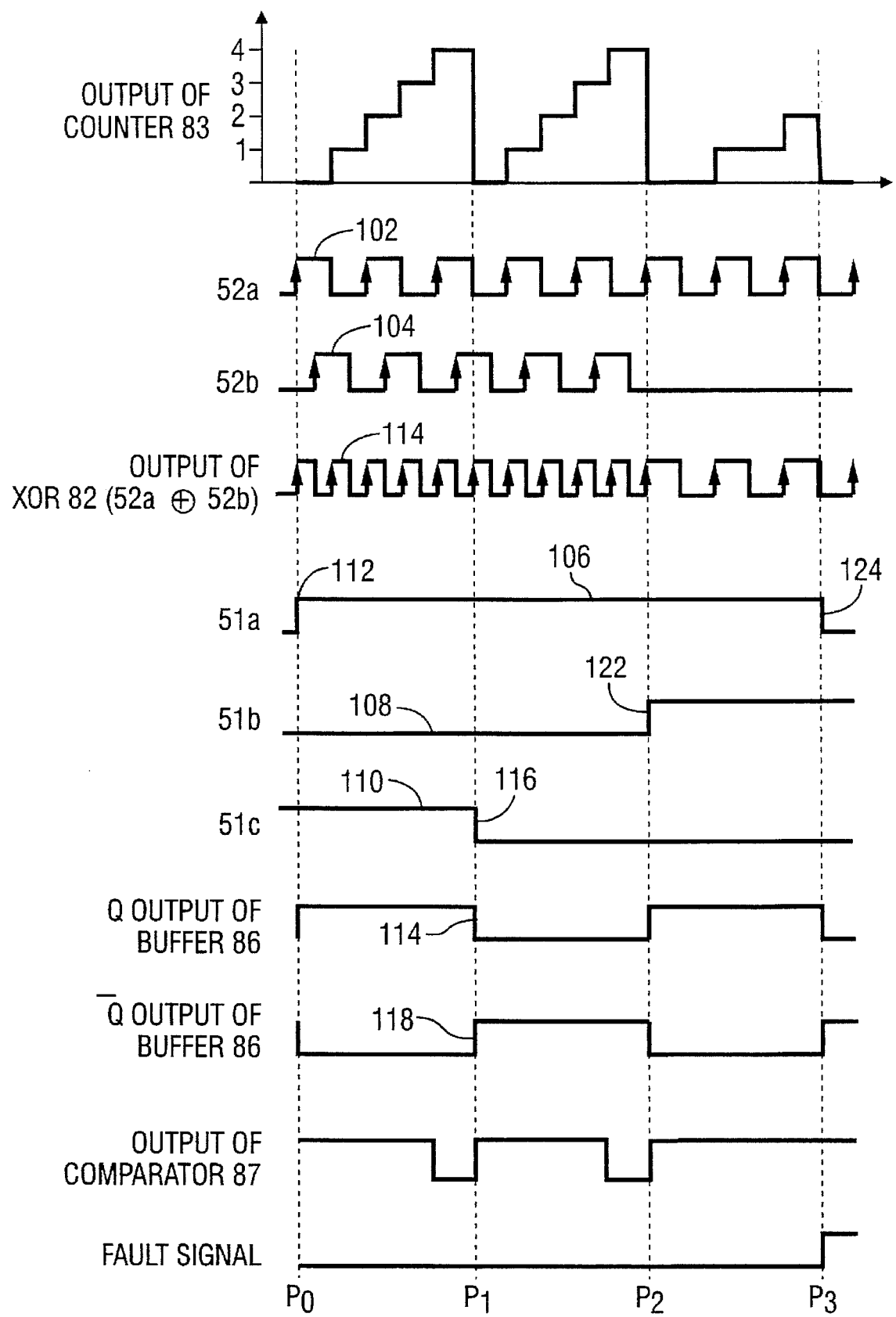
FIG. 9 shows an exemplary timing diagram for the sensor failure detection circuit of FIG. 8 receiving position signals from the position encoder of FIGS. 5a–5c.

FIG. 9 shows an exemplary timing diagram for the sensor failure detection circuit of FIG. 8 receiving position signals from the position encoder of FIGS. 5a–c for a 22.5° angular rotation of the rotor, and thus a 22.5° rotation of cup-vane 50. Signal 52a represents the position signal from position sensor 52a of encoder 42, and signal 52b represents the position signal from position sensor 52b. The signal below 52a and 52b represents the output of XOR gate 82. The outputs from the sensors 51a, 51b and 51 c are illustrated below those of 52a, 52b and the output of XOR gate 82. In the particular embodiment described above, the signals from sensors 52a and 52b have a higher resolution than the signals from sensors 51a–51c.

As can be seen from the timing diagram of FIG. 9, the first state change for the outputs of sensors 51a–51 c occurs at a point P0 where the output from sensor 51a changes from a logic low level to a logic high level. The state change will cause the output from decoder 85 to go from logic low to logic high and, as illustrated in FIG. 9, will correspondingly cause the Q output of buffer 86 to go from logic low to logic high. This will reset the counter 83 as shown by the Counter Output listing in FIG. 9. At this time, because the output of the counter 83 is less than the lower value expected, the output of the Comparator 87 will be logic high.

After the reset signal resets the counter 83 at point $P_0$, the counter is clocked by the output of XOR gate 82, thereby counting the number of high resolution increments of rotation from the reset. At the point where the counter 83 has received four clock pulses, its output will be four and the output of the Comparator 87 will drop to logic low.

At a point $P_1$, another state change occurs for the outputs of sensors 51a–c when the output of sensor 51 c drops from logic high to logic low. At this point, the Q output of buffer 86 drops to logic low and the change in the $\overline{Q}$ output of buffer 86 latches the output of the Comparator 87 into the Latch 88 to provide a fault signal. Since, in this example, at that time the output of the Comparator 87 is a logic low, the latched FAULT signal is a logic low indicating proper operation of the sensors.

The waveforms from point $P_1$ through $P_3$ illustrate how the circuitry of FIG. 8 may be used to detect a sensor failure. In the example of FIG. 9, it is assumed that sensor 52b has failed such that its output is always a logic low. At the point $P_3$ the next state change of the outputs of sensors 51a–c occurs and the counter 83 is reset. As before the counter is clocked with the output of XOR gate 82. In this example, because the output of sensor 52b is always logic low, the output of XOR gate 82 will track the output of sensor 52a. Accordingly, by the time the next state change in the outputs of sensors 51a–c occurs at point $P_3$, and the output of comparator 87 is latched to the fault signal, the counter 83 will have received less than four clock pulses. As such the output of counter 83 will be less than the expected lower value and the logic high output from comparator 87 will be latched to the fault signal indicating a sensor fault.

Controller circuitry (not shown) can monitor the output of the sensor failure detection circuitry to determine when a sensor failure has occurred. Upon the occurrence of a sensor failure, the controller circuitry can stop operation of the drive, switch to an auxiliary positioning scheme or perform some type of fault detection feature.

Although the example above addresses a failure in sensor 52b, it may be noted from an analysis of the circuit of FIG. 8 that a failure in any of the other sensors 51a–c and 52a will also produce a fault signal indicating that a sensor failure has occurred.

Figure 10:
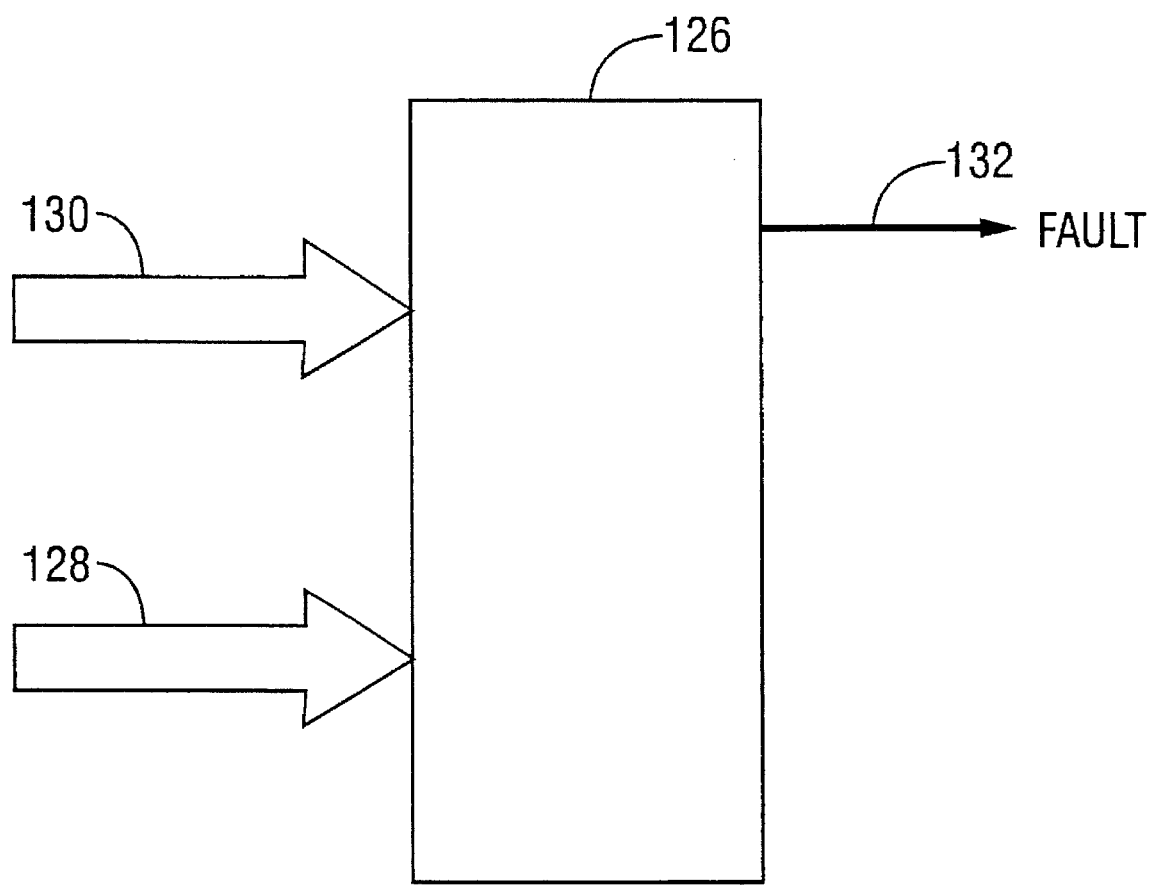
FIG. 10 generally shows another embodiment of a sensor failure detection circuit in accordance with the present invention.
Figure 11:
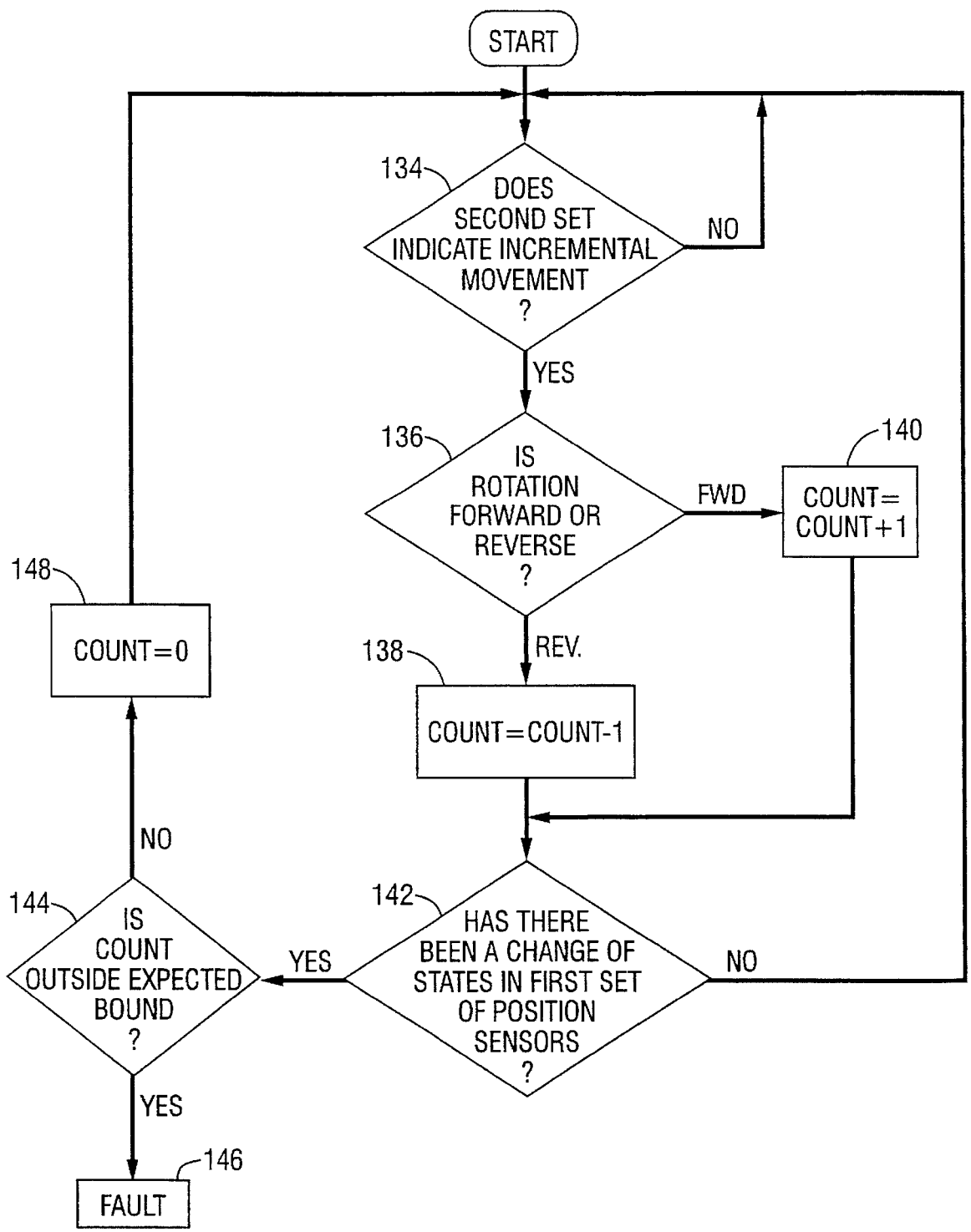
FIG. 11 shows a general flow chart diagraming the operation of the sensor failure detection circuit of FIG. 10.
Figure 11B:
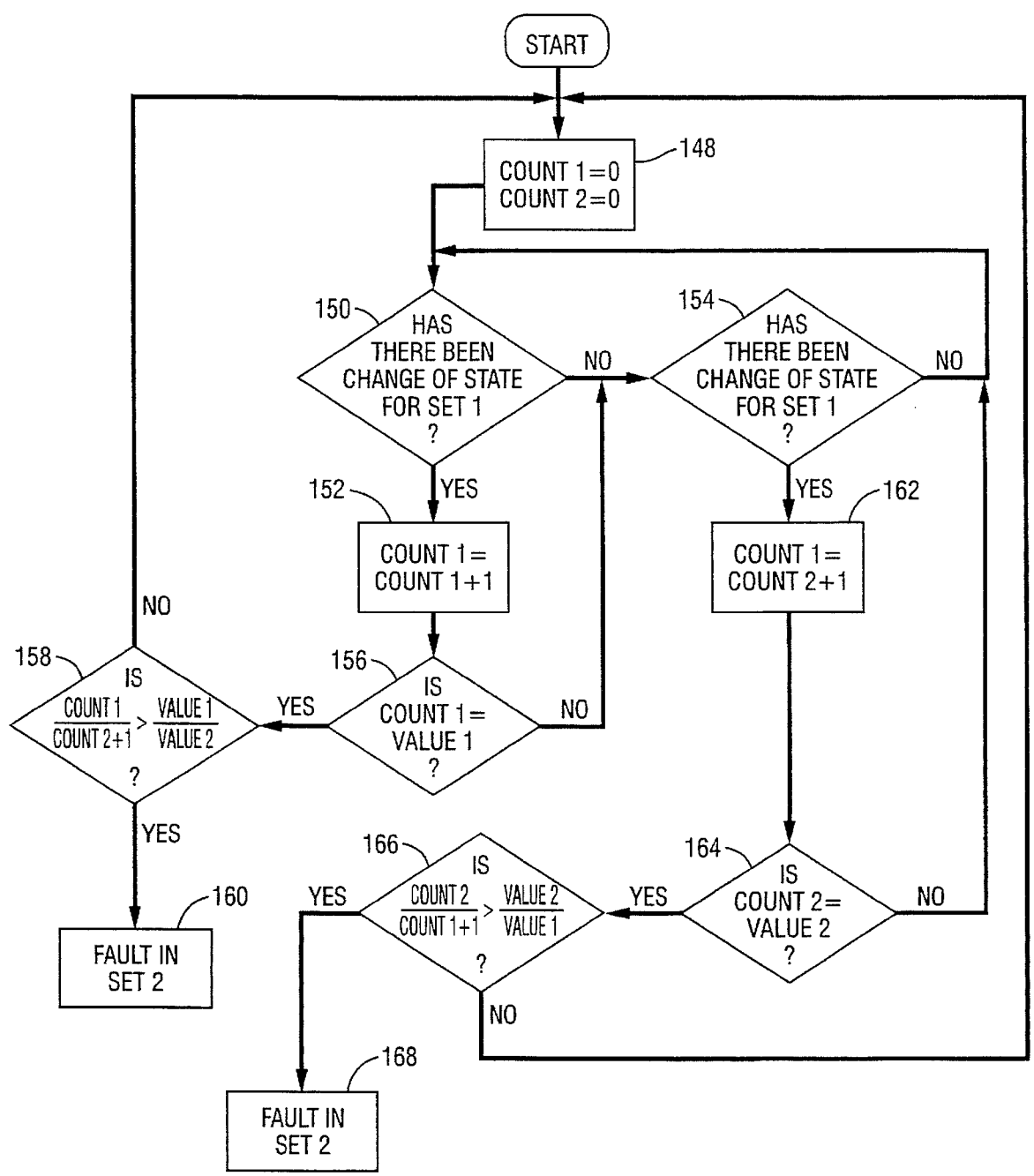

Further, although the embodiment of FIG. 8 illustrates the sensor failure detection circuit as comprising discrete and separate components, embodiments are envisioned where the circuitry utilizes the same circuitry used in other parts of the circuit. For example, it is possible to combine the controller of FIG. 4 with the sensor failure detection circuitry of FIG. 8 such that the same circuitry is used for increment detectors 61 and 80. Still further, alternate embodiments of the present invention are envisioned in which a properly programmed microprocessor is used to perform the general functions performed by the circuitry of FIG. 8. FIGS. 10 and 11 illustrate one such embodiment.

FIG. 10 generally shows another embodiment of a sensor failure detection circuit, in which a programmed microprocessor or microcontroller 126 receives a first set of position signals 128 of a first resolution and a second set of position signals 130 of a second resolution. The circuitry 126 monitors the sets of input signals 130 and 128 and provides a Fault signal on line 132 upon the occurrence of a position sensor failure. The sensor failure detection circuit 126 may include an Application Specific Integrated Circuit (ASIC) which determines whether the relationship between the position signals 128 and 130 is consistent with normal position sensor operation. Alternatively, the sensor failure detection circuit 126 can include a microprocessor running appropriate software and any storage required for storing and comparing the position signals from the sets of position sensors.

FIG. 11 shows a general flow chart diagraming the operation of the sensor failure detection circuit 126. At step 134, the detection circuit 126 determines whether the position signals 130 from the second set of position sensors 52a–52b indicate that the rotor has moved a high resolution increment. When the position signals 130 indicate such movement, the detection circuit 126 next determines whether the rotor is moving forward or reverse at step 136. If the rotor is moving in reverse, a COUNT variable is reduced by one at step 138, and if the rotor is moving forward, the COUNT variable is incremented by one at step 140. Next, at step 142, the detection circuit 126 determines, from the position signals 128 from the first set of position sensors 51a–c, whether a change of state has occurred in the position signals 128. If not, the detection circuit 126 returns to step 134. If so, at step 144, the detection circuit 126 compares the value stored in the COUNT variable with an expected value representing the number of increments indicated by the position signals 130 between a change of state of the position signals 128. If COUNT is outside the expected range, then a position sensor failure has occurred. But if COUNT is within the expected range, then the COUNT variable is reset at step 148, and the detection circuit 126 returns to step 134.

Further alternate embodiments are envisioned that use two incremental encoders with different resolutions or two absolute encoders with different resolutions. Moreover, although the above embodiments of the present invention include a logic circuit, an ASIC or a microprocessor, those skilled in the art will understand that the present invention can be performed by a properly programmed microcontroller, a specific logic circuit, or analog circuitry.

Although the invention has been described in terms of rotary machines, the skilled person will be aware that the same principles of operation can be applied to a linear position encoder to equal effect. For example, the skilled person will be aware that a reluctance machine (as with other types of electric machine) can be constructed as a linear motor. The moving member of a linear motor is referred to in the art as a rotor. The term "rotor" used herein is intended to embrace the moving member of a linear motor as well.

Accordingly, the principles of the present invention, which have been disclosed by way of the above examples and discussion, can be implemented using various circuit types and arrangements. Those skilled in the art will readily recognize that these and various other modifications and changes may be made to the present invention without strictly following the exemplary application illustrated and described herein and without departing from the true spirit and scope of the present invention, which is set forth in the following claims.

What is claimed is:

1. A rotor position encoder system for an electric machine comprising:

a rotor position encoder that provides a first set of signals at a first resolution and a second set of signals at a second resolution, wherein the first resolution is lower than the second resolution;

a decoder coupled to receive the first set of signals from the rotor position encoder, the decoder generating a first signal that changes state upon a change in state of the first set of signals;

an increment detector coupled to receive the second set of signals from the rotor position encoder, the increment detector generating a second signal that changes state upon a change in state of the second set of signals;

a counter coupled to receive the first signal and the second signal, wherein the counter is reset in response to a change in state of the first signal and wherein the output of the counter is incrementally changed in response to a change in state of the second signal;

a first comparator coupled to receive the output of the counter and a signal corresponding to a lower predetermined value, the first comparator producing an output that has a first state whenever the output of the counter is less than the lower predetermined value; and circuitry for monitoring the output of the first comparator and indicating a failure of the rotor position encoder whenever the output of the first comparator is at the first state when a change in state of the first set of signals occurs.

2. The rotor position encoder system of claim 1 wherein the rotor position encoder comprises:

a vane including a first set of teeth defining a first set of mark regions and a first set of space regions, and a second set of teeth defining a second set of mark regions and a second set of space regions;

a first set of position sensors positioned such that each position sensor in the first set produces an output signal at a first logic level when near a mark region in the first set, and an output signal at a second logic level when near a space region in the first set, the outputs from the first set of position sensors comprising the first set of signals at a first resolution; and a second set of position sensors positioned such that each position sensor in the second set produces an output signal at the first logic level when near a mark region in the second set and an output signal at a second logic level when near a space region in the second set, the outputs from the second set of position sensors comprising the second set of signals at a second resolution.

3. The rotor position encoder system of claim 2 wherein the number of teeth in the second set is greater than the number of teeth in the first set.

4. The rotor position encoder system of claim 2 wherein the position sensors in the first and second sets of position sensors comprise optical sensors.

5. The rotor position encoder system of claim 2 wherein the first set of position sensors comprises three position sensors and wherein the second set of position sensors comprises two position sensors.

6. The rotor position encoder system of claim 2 wherein the increment detector comprises an exclusive OR gate.

7. The rotor position encoder system of claim 1 further comprising a second comparator coupled to receive the output of the counter and a signal corresponding to an upper predetermined value, the second comparator producing an output that has a first state whenever the output of the counter is greater than the upper predetermined value.

8. The rotor position encoder system of claim 7 wherein the circuitry for monitoring the output of the first comparator includes circuitry for monitoring the output of the second comparator and indicating a failure of the rotor position encoder whenever the output of either the first comparator or the second comparator is at the first state when a change in the state of the first set of signals occurs.

9. The rotor position encoder system of claim 1 wherein the output of the counter is incremented in response to a change in state of the second signal.

10. The rotor position encoder system of claim 9 wherein the output of the counter is incremented in response to each change in state of the second signal from a logic low level to a logic high level.

11. The rotor position encoder system of claim 1 wherein the circuitry for monitoring the output of the comparator comprises a latch that receives the output of the comparator wherein the latch is triggered in response to a change in state of the first signal.

12. The rotor position encoder system of claim 1 wherein the latch is triggered in response to each change in state of the first signal from a logic low level to a logic high level.

13. A method of detecting sensor failure for a position encoder comprising the steps of:

receiving from a first set of at least one position sensor position signals which change state at a first resolution, and from a second set of at least one position sensor position signals which change state at a second resolution where the second resolution is greater than the first resolution;

counting the number of changes in the state of the position signals at the second resolution between changes in state of the position signals at the first resolution to provide a count;

comparing the count with a predetermined value which represents an expected count of the number of position signals at the second resolution between a change in state of the position signals at the first resolution; and indicating a sensor failure if the difference between the count and the predetermined value is greater than a predefined amount.

14. The method of claim 13 further including the steps of initializing the count after a change in state of the position signals at the first resolution, comparing the count to the predetermined value at the change in state of the position signals at the first resolution, and indicating a sensor failure if the count at the time of the comparison is less than the predetermined value.

15. The method of claim 13 further including the steps of initializing the count after a change in state of the position signals at the first resolution, comparing the count to the predetermined value at the change in state of the position signals at the first resolution, and indicating a sensor failure if the count at the time of the comparison is greater than the predetermined value.

16. A method for detecting a sensor failure for a position encoder comprising the steps of:

receiving position signals at a first resolution from a first set of at least one position sensor, and position signals at a second resolution from a second set of at least one position sensor;

monitoring the position signals from the first set of at least one position sensor and the second set of at least one position sensor;

counting the number of the position signals at the second resolution that occur between the position signals at the first resoultion; and indicating a sensor failure if the count is outside a predetermined range.

17. A method for detecting a sensor failure for a position encoder comprising the steps of:

receiving position signals at a first resolution from a first set of at least one position sensor, and position signals at a second resolution from a second set of at least one position sensor, wherein the position signals at the first resolution comprise a first series of digital pulses and wherein the position signals at the second resolution comprise a second series of digital pulses;

monitoring the position signals from the first set of at least one position sensor and the second set of at least one position sensor; counting the number of digital pulses in the second series that occur between digital pulses in the first series; and indicating a sensor failure if the count is outside a predetermined range.

18. A method of detecting sensor failure for a position encoder comprising the steps of:

receiving from a first set of at least one position sensor position signals which change state at a first resolution, and from a second set of at least one position sensor position signals which change state at a second resolution where the second resolution is greater than the first resolution;

counting the number of changes in the state of the position signals at the second resolution between changes in state of the position signals at the first resolution to provide a count;

comparing the count with an upper predetermined value and a lower predetermined value which define a range of expected counts of the number of position signals at the second resolution between a change in state of the position signals at the first resolution; and indicating a sensor failure if the count is greater than the upper predetermined value or lower than the lower predetermined value.

19. A rotor position encoder system for an electric machine comprising:

a rotor position encoder that provides a first set of signals at a first resolution and a second set of signals at a second resolution, wherein the first resolution is lower than the second resolution;

a decoder coupled to receive the first set of signals from the rotor position encoder, the decoder generating a first signal that changes state upon a change in state of the first set of signals;

an increment detector coupled to receive the second set of signals from the rotor position encoder, the increment detector generating a second signal that changes state upon a change in state of the second set of signals;

a counter coupled to receive the first signal and the second signal, wherein the counter is reset in response to a change in state of the first signal and wherein the output of the counter is incrementally changed in response to a change in state of the second signal;

a comparator coupled to receive the output of the counter and a signal corresponding to an upper predetermined value, the counter producing an output that has a first state whenever the output of the counter is less than the predetermined value; and circuitry for monitoring the output of the comparator and indicating a failure of the rotor position encoder whenever the output of the comparator is at the first state when a change in state of the first set of signals occurs.

20. A sensor failure detection circuit for a position encoder, the sensor failure detection circuit receiving position signals at a first resolution from a first set of at least one position sensor, and position signals at a second resolution from a second set of at least one position sensor, the detection circuit monitoring the position signals from the first set of at least one position sensor and the second set of at least one position sensor and detecting a position sensor failure by counting the number of the position signals at the second resolution that occur between the position signals at the first resolution and indicating a sensor failure if the count is outside a predetermined range.

21. A sensor failure detection circuit for a position encoder, the sensor failure detection circuit receiving from a first set of at least one position sensor position signals which change state at a high resolution, and from a second set of at least one position sensor position signals which change state at a lower resolution, the detection circuit monitoring a count for the position signals at the high resolution between states of the position signals at the lower resolution, comparing the count with a predetermined range which represents an expected count for the position signals at the high resolution between the states of the position signals at the lower resolution, and indicating a sensor failure if the count is outside the predetermined range.

* * * * *